United States Patent Office 3,330,857

Patented July 11, 1967

1

3,330,857

N-CARBAZOYLAMINO ACID INTERMEDIATES FOR POLYPEPTIDES

Hans-Jürgen E. Hess, Groton, Conn., assignor to Chas. Pfizer & Co., Inc., New York, N.Y., a corporation of Delaware No Drawing. Filed July 1, 1963, Ser. No. 292,160
12 Claims. (Cl. 260—471)

This invention relates to novel polypeptides and to processes and intermediates for their preparation. More particularly, it relates to the advantageous substitution of non-amino acid units in polypeptide chains.

In recent years there has been widespread interest in the biologically active polypeptides, and particularly in the pituitary hormones including oxytocin, vasopressin, the melanocyte-stimulating hormones and ACTH, as well as in angiotensin and bradykinin, the peptides derived from blood plasma. Such polypeptides offer a variety of valuable properties. A common feature of angiotensin, bradykinin, oxytocin, vasopressin, eledoisin and kallidin is their cardiovascular and smooth-muscle contracting action. Oxytocin is useful for induction of labor and prevention of post-partum hemorrhage, angiotension is employed in treatment of shock, bradykinin is a vasodilator, and vasopressin is an antidiuretic. Another group of peptides are those derived from insulin, which exhibit hypoglycemic activity.

A major problem in the practical therapeutic application of the biologically active polypeptides resides in the brief duration of their action, resulting from enzymatic degradation, i.e., hydrolysis of amido bonds, in the body. The site of attack will vary with the particular enzyme and polypeptide. For example, terminal amino acids may be cleaved from the polypeptide by exopeptidases such leucine aminopeptidase and carboxypeptidase; and cleavage can also occur along the chain, e.g., at the carboxyl end of basic and aromatic amino acids through the action of enzymes related to trypsin and chymotrypsin, respectively.

It has now been discovered that it is possible to alter peptide structure in a manner which will enhance enzymatic stability and prolong action, without destroying biological activity. This unexpected advantage is achieved by replacing the α-methylidyne group (i.e., ≡CH) of at least one component amino acid residue $$—NH—CHR^1—C:O—$$

by a nitrogen atom:

$$—NH—NR^1—C:O—$$

Where $R^1$ is other than hydrogen, the α-carbon represents an asymmetric center, which is eliminated in the new products, thus also affording an important advantage in the synthesis of these substances.

Enzymatic experiments reveal that the polypeptide chain position where carbon has been replaced by nitrogen is immune to enzymatic attack, and, what is particularly surprising, the adjacent positions are likewise immune. Nevertheless, the new products are found to exhibit the biological effects of the parent polypeptides, demonstrating for the first time that substitution of a non-amino acid unit may be effected in a polypeptide chain without destroying activity. Furthermore, the enhanced stability to enzymatic destruction is reflected in a prolonged duration of that activity.

While the present invention embraces any biologically active polypeptide wherein at least one α-methylidyne group is replaced by a nitrogen atom, particularly pre-

2 ferred for their outstanding properties are those wherein the parent polypeptide is bovine angiotensin II, HAsp-Arg-Val-Tyr-Val-His-Pro-PheOH equine angiotensin II, HAsp-Arg-Val-Tyr-Ileu-His-Pro-PheOH bovine oxytocin, HCyS-Tyr-Ileu-Glu($NH_2$)-Asp($NH_2$)-CyS-Pro-Leu-Gly($NH_2$)

bradykinin,

HArg-Pro-Pro-Gly-Phe-Ser-Pro-Phe-ArgOH or bovine vasopressin,

HCyS-Tyr-Phe-Glu($NH_2$)-Asp($NH_2$)-CyS-Pro-Arg-Gly($NH_2$)

The foregoing formulae employ the familiar condensed notation wherein the abbreviations denote the radicals listed:

| | |
|---|---|
| Gly—glycyl | Asp ($NH_2$)—asparaginyl |
| Gly ($NH_2$)—glycine amide | Glu ($NH_2$)—glutaminyl |
| Val—valyl | Ser—seryl |
| Leu—leucyl | CySH—cysteinyl |
| Ileu—isoleucyl | His—histidyl |
| Phe—phenylalanyl | Arg—arginyl |
| Tyr—tyrosyl | Lys—lysyl |
| Asp—aspartyl | Pro—prolyl |

As explained, the α-methylidyne group of at least one amino acid unit is replaced by a nitrogen atom in the new polypeptides. For example, if a phenylalanyl unit is selected for such substitution, then the polypeptide will contain the sequence $$—NH—N(CH_2C_6H_5)—CO—$$

in place of the conventional phenylalanyl group $$—NH—CH(CH_2C_6H_5)—CO—$$

Similarly, if an arginyl group is selected for substitution, the polypeptide will contain the sequence $$—NH—N(CH_2CH_2CH_2NHC[:NH]NH_2)—CO—$$

in place of $$—NH—CH(CH_2CH_2CH_2NHC[:NH]NH_2)—CO—$$

Ordinarily, best results are obtained by effecting the substitution at the principal sites of observed enzymatic degradation, or immediately adjacent those sites.

In addition to the valuable polypeptides described, the present invention also embraces new intermediates of the formula $$RNH—\overset{R^1}{\overset{|}{N}}—CONH—\overset{R^2}{\overset{|}{CH}}—COR^3 \qquad (I)$$

which are useful in the synthesis of the new products. In this formula,

R may be an amino-masking group, preferably formyl, acetyl, t-butyloxycarbonyl, cyclopentyloxycarbonyl or cyclohexyloxycarbonyl. Alternatively, it will sometimes be convenient to employ another masking group for R, e.g. a trityl, tosyl, benzyloxycarbonyl, p-substituted benzyloxycarbonyl group (where the p-substituent is methyl, chloro, bromo or nitro) or equivalent masking group;

$R^1$ may be hydrogen, primary or secondary lower alkyl, 3-indolylmethyl, 5-imidazolylmethyl, $—ZCOR^4$, $—ZCH_2NHR^5$, $—(CH_2)_3NHC(:NH)NHR^6$, benzyl or

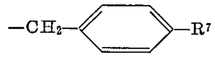

$R^2$ may be hydrogen, primary or secondary lower alkyl, 3-indolylmethyl, 5-imidazolylmethyl, 3-ureidopropyl, —$Z^1R^8$, mercaptomethyl, benzylmercaptomethyl, 2-mercaptoethyl, 2-methylmercaptoethyl, 2-benzylmercaptoethyl, —$ZCOR^4$, —$ZCH_2NHR^5$,

—$(CH_2)_3NHC(:NH)NHR^6$ benzyl, or

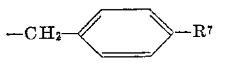

$R^3$ may be hydroxy, or it may be a carboxy-masking group, preferably lower alkoxy, phenoxy, para-nitrophenoxy, amino, or an equivalent masking group;

$R^4$ may also be hydroxy, or a carboxy-masking group, preferably lower alkoxy or amino, or an equivalent masking group;

$R^5$ may be hydrogen, or it may be an amino-masking group, preferably tosyl, cyclopentyloxycarbonyl, cyclohexyloxycarbonyl or benzyloxycarbonyl. Alternatively, it will sometimes be convenient to employ another masking group for $R^5$, e.g. a formyl, acetyl, trityl, t-butyloxycarbonyl, p-substituted benzyloxycarbonyl group (wherein the p-substituent is methyl, chloro, bromo or nitro), or equivalent masking group;

$R^6$ may be hydrogen, or it may be an amino-masking group, preferably nitro, benzyloxycarbonyl or tosyl. Alternatively, it will sometimes be convenient to employ another masking group for $R^6$, e.g. a formyl, acetyl, trityl, t-butyloxycarbonyl, cyclopentyloxycarbonyl, cyclohexyloxycarbonyl, or p-substituted benzyloxycarbonyl group (where the p-substituent may be as already described above), or an equivalent group;

$R^7$ and $R^8$ may be hydroxy, or they may be hydroxy-masking groups, preferably lower alkoxy, benzyloxy, lower alkanoyloxy, benzoyloxy, or an equivalent masking group;

Z is a straight-chain alkylene of from one to three carbon atoms; and $Z^1$ is straight-chain alkylene of from one to two carbon atoms.

The preparation of these new intermediates and their utilization is illustrated in the appended flow sheet, wherein R, $R^1$, $R^2$ and $R^3$ have the significance ascribed above, and $R^{11}$ represents an $R^1$ group (other than hydrogen) from which a hydrogen atom has been abstracted.

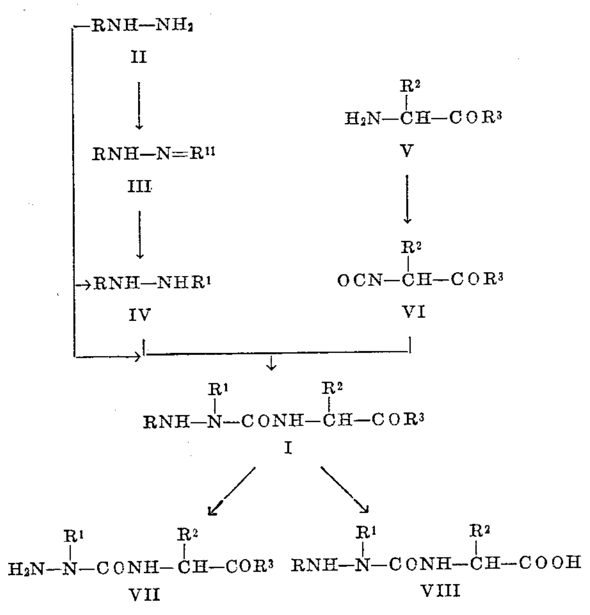

In the foregoing reaction scheme,

II→III represents condensation of hydrazine II with a carbonyl compound O=$R^{11}$, suitably in the presence of a minor proportion of an acid such as glacial acetic acid;

III→IV where $R^1$ is other than hydrogen, represents a hydrogenation reaction, preferably in the presence of noble metal catalyst;

II→IV represents condensation of hydrazine II with $R^1X$, where $R^1$ is other than hydrogen and X is tosyl, chloro, bromo or iodo, preferably employing an excess of the hydrazine to minimize di-substitution;

V→VI represents reaction of amino acid compound V (as such or, if desired, in the form of a readily available acid addition salt such as the hydrochloride or hydrobromide) with phosgene or trichloromethyl-chloroformate (diphosgene);

II+VI→I, IV+VI→I represent condensation of isocyanate VI with a hydrazine compound, suitably under basic conditions, e.g. in a solvent such as pyridine;

I→VII represents removal of amino-masking group R, as further discussed hereinafter, to generate a free amino compound or a mineral acid addition salt thereof, ready for condensation with amino acid compounds to build a polypeptide chain toward the left by known procedures;

I→VIII where $R^3$ is other than hydroxy, represents removal of a carboxyl-masking group, as further discussed hereinafter, to generate a free carboxylic acid, ready for condensation with amino acid compounds to build a polypeptide chain toward the right by known procedures.

The new biologically active polypeptides are obtained from the intermediates shown by well known methods, as further illustrated in the appended examples. The individual amino acids may be joined successively, or smaller peptide sequences may first be formed and then linked to these intermediates.

The reactions described may be conducted in accordance with standard procedures, well known to those skilled in the art. It will often be convenient to conduct the reaction in a reaction-inert solvent, i.e. one which is free from adverse effect on the reactants and products under the conditions employed. Examples of solvents which are often appropriate include alcohols such as ethanol, aromatic media such as toluene, chlorinated solvents such as chloroform, and acids such as glacial acetic acid. For condensation of amino with carboxyl groups in synthesis of the polypeptide chain it is often advantageous to conduct the reaction in the presence of a condensing agent such as N,$N^1$-dicyclohexylcarbodiimide, suitably in a solvent system such as tetrahydrofuran or dimethylformamide-acetonitrile.

The products and intermediates may be recovered by standard procedures, including evaporation of the reaction medium, or precipitation by addition of ether or another non-solvent. If desired, the compounds may be further purified by conventional methods, including trituration with ether, ethyl acetate, hexane, mixtures of these, or the like; solvent distribution in such systems as butanol:water, butanol:acetic acid, methanol:water:chloroform:benzene; or by recrystallization, e.g. from hexane-ethyl acetate, hexane-methylene chloride, cyclohexane-methylene chloride, or mixtures of alcohols such as methanol or ethanol with water, ether, isopropyl ether, ethylene dichloride or the like. Other methods and/or solvents will readily occur to those skilled in the art.

Of course, normal discretion should be exercized in subjecting certain of the intermediates to the herein described reaction steps. Thus, free amino and carboxy groups should be protected from reaction in the early steps and the masking groups removed (as indicated in reactions I→VII and I→VIII) when condensation is to be carried out. Similarly, phenoxy and p-nitrophenoxy esters may be employed for direct acylation of amines, as further illustrated hereinafter, and can be prepared from the free carboxylic acid at the appropriate stage.

Among the amino-masking groups, trityl is subject to cleavage in hydrogenation reactions and under some acid conditions, and it is therefore preferable to avoid it in reactions III→IV and V→VI. If desired, such groups can readily be introduced subsequent to these steps or the indicated alternative routes followed. Likewise, cyclopentyloxycarbonyl, formyl and t-butyloxycarbonyl groups are subject to cleavage in acid, and are best avoided in reaction V→VI; the same is true of benzyloxycarbonyl, p-substituted benzyloxycarbonyl and tosyl groups in reaction III→IV.

Among the carboxy-masking groups, t-butoxy esters are subject to acid cleavage and are therefore preferably avoided in reaction V→VI. If they are desired in this portion of the molecule for subsequent reaction steps, they may readily be prepared from the corresponding free acids by treatment with isobutylene in the presence of mineral acid, as further illustrated in the appended examples. Similarly, amide groups may give difficulty in the preparation of isocyanates VI, but can be generated at a later stage from the corresponding alkyl esters by treatment with ammonia in alcohol, as shown in the examples.

In addition to the foregoing precautions, free hydroxy and mercapto groups are preferably masked, e.g. as alkoxy or benzylthioether respectively, for reaction V→VI, and subsequently regenerated.

Masking groups can be removed when desired by a variety of standard procedures, including those illustrated in the appended examples. Thus, hydrolysis with mineral acid is effective for conversion of carboxylic esters to the corresponding acids, and may also be employed under known, appropriate conditions for cleaving various amino-masking groups including formyl, trityl, cyclopentyloxycarbonyl and t-butyloxycarbonyl. Carboxylic esters other than t-butyl esters are also converted to the corresponding carboxylic acids by alkaline hydrolysis, which is likewise effective in cleaving alkanoloxy and benzoyloxy protecting groups. Treatment with soduim in liquid ammonia is a preferred procedure for cleaving tosyl amino-masking groups, and may also be employed to remove benzyloxycarbonyl groups and to cleave benzylthioethers. Alkyl and benzyl ethers are cleaved by treatment with hydrogen bromide in galacial acetic acid, and this procedure also removes certain amino-masking groups including cyclopentyloxycarbonyl, cyclohexyloxycarbonyl, benzyloxycarbonyl and t-butyloxycarbonyl. Nitroarginyl groups are converted to arginyl by hydrogenolysis in the presence of noble metal catalyst such as palladium, and this is also a preferred procedure for cleaving benzyl ethers. Benzyloxycarbonyl and trityl amino-protecting groups are likewise removed in this way. The varied stability of the masking groups toward various agents allows the selective removal of one protective group from diprotected amino acids such as ornithine, lysine or arginine, providing that two different protecting groups have been employed. Additionally, Nα, Nε-trityl lysine peptides afford a convenient flexibility in that the Nα-trityl group may be cleaved by acid with retention of the Nε-trityl group.

In general, the reaction sequence II→III→IV will be preferred to the sequence II→IV except where $R^1$ is $-(CH_2)_3NHC(:NH)NHR^6$, $-(CH_2)_2NHR^5$ or $$-(CH_2)_3NHR^5$$

Where the step II→IV is employed, it will be noted that a participating reactant is a compound of the formula $R^1X$ wherein X is tosyl, chloro, bromo or iodo ($R^1$ to be as previously defined, but not to be hydrogen). Such halo or tosyl reactants are readily prepared from the corresponding hydroxyl compounds $R^1OH$ by standard methods. All other starting compounds are also readily available or preparable by known methods.

In addition to the masking systems illustrated above, other equivalent protective groupings may be employed. In the case of arginyl groupings, protection in the form of the dibenzyloxycarbonyl derivative will sometimes be desirable. Other systems will occur to those skilled in the art.

Depending upon reaction conditions, the new products of the present invention are obtained in form of the free bases or the salts thereof. The invention embraces the acid-addition salts of the new polypeptides and of those intermediates having a free amino group, e.g. those of structure VII. Such salts are formed by well known procedures, further illustrated in the examples, with both pharmaceutically acceptable and pharmaceutically unacceptable acids. By "pharmaceutically acceptable" is meant those salt-forming acids which do not substantially increase the toxicity of the polypeptides. The pharmaceutically acceptable acid-addition salts of the new polypeptides are useful in therapy. These may be formed by reaction of the bases with mineral acids such as hydrochloric, hydrobromic, phosphoric, metaphosphoric, nitric and sulfuric acids, as well as with organic acids such as tartaric, acetic, citric, malic, lactic, fumaric, benzoic, glycollic, gluconic, gulonic, succinic, arylsulfonic, e.g. p-toluenesulfonic acids, and the like. The pharmaceutically unacceptable acid-addition salts, including those formed with hydrofluoric and perchloric acids, while not useful for therapy, are valuable for isolation and purification of the new polypeptides and intermediates. Further, they are useful for the preparation of the free bases as well as the pharmaceutically acceptable salts. It will be obvious that, in addition to their value in therapy, the pharmaceutically acceptable acid-addition salts of the new polypeptides are also useful in isolation and purification. Particularly preferred are the miner acid-addition salts of intermediates VII and the pharmaceutically acceptable acid-addition salts of the new biologically active polypeptides. Those substances containing a plurality of free amino groups may be obtained in the form of mono- or poly-acid-addition salts, or as mixed salts of a plurality of acids.

The new polypeptides of the present invention can advantageously be employed in pharmaceutical applications. In tests in standard experimental animals they exhibit potent biological activity which is qualitatively similar to but of greater duration than that of the natural products. For example, the polypeptides $$HAsp\text{-}Arg\text{-}NHN[CH(CH_3)_2]CO\text{-}Tyr\text{-}Val\text{-}His\text{-}Pro\text{-}PheOH \quad (A)$$

and $$HArg\text{-}NHN[CH(CH_3)_2]CO\text{-}Tyr\text{-}Val\text{-}His\text{-}Pro\text{-}PheOH \quad (B)$$

show pressor activity in rats like that of bovine angiotensin II $$HAsp\text{-}Arg\text{-}Val\text{-}Tyr\text{-}Val\text{-}His\text{-}Pro\text{-}PheOH \quad (C)$$

but at equipressor dosages the duration of action is approximately double that of the natural product. Threshold dosages for activity are as follows:

| Peptide | A | B |
|---|---|---|
| Rat Blood Pressure (per kg. body weight) | 2 μg. | 10 μg. |
| Contraction of Isolated Guinea Pig Ileum [1] | 0.1 μg./cc. | 0.5 μg./cc. |
| Contraction of Isolated Rat Uterus [2] | 0.05 μg./cc. | 0.5 μg./cc. |

[1] Helv. Chem. Acta 44, p. 671 (1961).
[2] Amer. J. Physiol. 201, p. 51 (1961).

When these peptides are subjected to digestion with various enzymes, results are as follows:

| | Peptide | | |
|---|---|---|---|
| | A | B | C |
| Pepsin | Substantially stable. | Stable | Cleaves.[1] |
| Chymotrypsin | Stable | do | Do.[2] |
| Leucine aminopeptidase | do | do | Do.[3] |

[1] At the Val³-Tyr bond.
[2] At the Tyr-Val⁵ bond.
[3] At the N-terminal acid.

The following examples are provided for illustrative purposes and should not be construed as limiting the invention, the scope of which is defined by the appended claims.

In the examples, optical rotations are measured in 1% ethanolic solution unless otherwise specified; ultraviolet spectra are determined in methanol. The paper chromatography systems are (1) cyclohexane-formamide (saturated);
(2) benzene-cyclohexane/formamide (1:1);
(3) benzene-diethylamine/formamide (9:1);
(4) benzene-chloroform/formamide (1:1);
(5) carbon tetrachloride-diethylamine/formamide;
(6) chloroform-diethylamine/formamide (95:5);
(7) methyl isobutyl ketone-formic acid (88%)-water (2:1:1);
(8) benzene-acetone-formic acid (88%)-water (10:5:2:6);
(9) sec. butanol-formic acid (88%)-water (7:1:2);
(10) chloroform-formic acid (88%)-ethanol (95%) (2:2:1);
(11) n-butanol-acetic acid-water (4:1:1);
(12) sec. butanol-acetic acid-water (7:1:2);
(13) n-butanol-methyl ethyl ketone-ammonia (29%)-water (5:3:1:1);
(14) ethyl acetate-pyridine-water (12:3:4);
(15) n-butanol-pyridine-water (6:4:3);
(16) chloroform-methanol-diethylamine-water (9:5:1:5, bottom phase);
(17) butanol-dioxane-ammonia (29%).

Whatman No. 4 chromatographic paper is used unless otherwise specified.

EXAMPLE 1

*Isopropylidene-t-butyl carbazate*

To a solution of 10 g. of t-butyl carbazate in 15 g. of acetone is added 2 drops of glacial acetic acid, whereupon the temperature rises instantaneously. The mixture is cooled in an ice-bath and allowed to stand at room temperature for 15 hrs. The excess acetone is then removed in vacuo, yielding 13.0 g. of a viscous oil, which crystallizes on standing. This material is recrystallized from hot n-hexane; yield 10.55 g. (82%) in the form of needles. For analysis a sample is recrystallized once more, M.P. 103–105°.

*Analysis.*—Calcd. for $C_8H_{16}O_2N_2$: C, 55.79; H, 9.36; N, 16.27. Found: C, 55.94; H, 9.12; N, 16.48.

EXAMPLE 2

*t-Butyl 3-isopropyl carbazate*

Isopropylidene-t-butyl carbazate (2 g.) is dissolved in 60 cc. of absolute ethanol and 0.3 g. of platinum oxide added. The reaction mixture is hydrogenated at 3 atmospheres pressure for 3 hrs., when the calculated hydrogen is found to have been consumed. The catalyst is then separated by filtering and the solvent evaporated. A crystalline residue (2 g.) of M.P. 47–51° is obtained and dried at 25° for 24 hrs. for analysis.

*Analysis.*—Calcd. for $C_8H_{18}O_2N_2$: C, 55.14; H, 10.41; N, 16.08. Found: C, 55.01; H, 10.25; N, 16.06.

EXAMPLE 3

*O-benzoyl-L-tyrosine ethyl ester hydrobromide*

O-benzoyl-N-carbobenzoxy-L-tyrosine ethyl ester (10.6 g.) is dissolved in 50 cc. of 1.2 N hydrobromic acid in glacial acetic acid. Crystallization soon begins and after 30 min. at room temperature the mixture is poured into ether and the precipitate filtered; yield 8.7 g. (93%); M.P. 223°. A sample is recrystallized for analysis from methanol/ether, M.P. 221–223°, $[\alpha]_D=+11°$.

*Analysis.*—Calcd. for $C_{18}H_{19}O_4N\cdot HBr$: C, 54,83; H, 5.11; N, 3.55; Br, 20.27. Found: C, 54.98; H, 5.20; N, 3.44; Br, 20.28.

EXAMPLE 4

*O-benzoyl-L-carbonyl-tyrosine ethyl ester*

A finely powdered suspension of 8.6 g. of O-benzoyl-L-tyrosine ethyl ester hydrobromide in 150 cc. of anhydrous toluene is heated in an oil bath to 150°, and a stream of phosgene is introduced until a clear solution is obtained, generally after 45 minutes. The solvent is then removed in vacuo and the remaining light yellow oil used in the next example without further purification.

EXAMPLE 5

*N-[2-isopropyl-3-(t-butyloxycarbonyl)-carbazoyl]-O-benzoyl-L-tyrosine ethyl ester* t-Butyl 3-isopropyl carbazate (2.12 g., Example 2) is dissolved in 50 cc. of anhydrous pyridine. To the stirred solution at 0° is added 4.26 g. of O-benzoyl-L-carbonyl-tyrosine ethyl ester. The mixture is allowed to warm to room temperature and stirred for one hour. The pyridine is then removed in vacuo and the residual brown oil dissolved in 30 cc. of methylene chloride. This solution is washed successively with ice cold 1 N hydrogen chloride solution, water, sodium bicarbonate solution, and water; and subsequently dried with anhydrous sodium sulfate. The solvent is then evaporated, yielding 6.27 g. of a yellow foam, which is crystallized from methylene chloride/n-hexane; yield 5.13 g. (81%); M.P. 124.5–125.5°, $[\alpha]_D^{25}=+6.5°$. A sample is recrystallized for analysis once more, M.P. 125–126°; $[\alpha]=+6.1°$. Paper chromatography: $R_f(1)=0.2$. $R_f(2)=0.65$. Indicator: HCl/p-dimethylaminocinnamaldehyde spray.

*Analysis.*—Calcd. for $C_{27}H_{35}O_7N_3$: C, 63.14; H, 6.87; N, 8.18. Found: C, 63.40; H, 7.00; N, 8.33.

EXAMPLE 6

*N-[2-isopropylcarbazoyl]-O-benzoyl-L-tyrosine ethyl ester hydrochloride*

N - [2-isopropyl-3-(t-butyloxycarbonyl)-carbazoyl]-O-benzoyl-L-tyrosine ethyl ester (5.13 g.) is dissolved in 50 cc. of 6 N hydrogen chloride in dioxane. Ether is added after 30 min. and the crystalline material filtered; yield 4.11 g. (96%); M.P. 136–137°. Paper chromatography: $R_f(2)=0.78$; $R_f(4)=0.85$. Indicator: p-dimethylaminocinnamaldehyde spray.

*Analysis.*—Calcd. for $C_{22}H_{27}O_5N_3\cdot HCl$: C, 58.73; H, 6.27; N, 9.34; Cl, 7.88. Found: C, 59.00; H, 6.35; N, 9.57; Cl, 7.81.

EXAMPLE 7

*N-(2-isopropyl-carbazoyl)-O-benzoyl-L-tyrosine ethyl ester*

The hydrochloride of the preceding example (4.49 g.) is dissolved in 400 cc. of chloroform containing a small amount of ethanol, cooled to 0°, then washed with dilute sodium bicarbonate solution and subsequently with water. The organic layer is dried with sodium sulfate and the solvent evaporated, furnishing 4.04 g. (98%) of a crystalline residue, M.P. 146–148°. Recrystallization from ethanol-water yields 3.62 g. (87%) material of M.P. 146–147°, $[\alpha]_D^{25}=+20°$.

*Analysis.*—Calcd. for $C_{22}H_{27}O_5N_3$: C, 63.90; H, 6.58; N, 10.16. Found: C, 63.73; H, 6.59; N, 9.97.

Paper chromatography: $R_f(2)=0.78$. Indicator: p-Dimethylaminocinnamaldehyde spray.

EXAMPLE 8

*N-[2-isopropyl-3-(carbobenzoxy-nitro-L-arginyl-) carbazoyl-] O-benzoyl-L-tyrosine ethyl ester*

To a solution of 3.05 g. of N-(2-isopropyl-carbazoyl-) O-benzoyl-L-tyrosine ethyl ester and 2.62 g. of carbobenzoxy-nitro-L-arginine in 9 cc. of dimethylformamide and 15 cc. of tetrahydrofuran at 0° is added 1.53 g. of dicyclohexylcarbodiimide in 11 cc. of tetrahydrofuran. The mixture is stirred at room temperature for 15 hrs. and the N,N'-dicyclohexylurea (1.12 g., M.P. 227–229°) filtered. The filtrate is evaporated in vacuo, the residual oil triturated with anhydrous ether and the crystalline material (3.3 g., 58%) filtered. This is recrystallized from methanol-isopropyl ether to yield 1.28 g. (23%) product of M.P. 156–157°.

The analytical sample is recrystallized once more from the same solvent system; M.P. 156–158°, $[\alpha]_D^{25}=-8.9°$; $\lambda_{max.}$ 231, 268 m$\mu$ ($\epsilon$=22,050; 17,800). Paper chromatography: $R_f(1)=0.87$. Indicators: $SnCl_2$-diacetyl-reagent and p-dimethylaminocinnamaldehyde spray.

*Analysis.*—Calcd. for $C_{36}H_{45}O_{10}N_8$: C, 57.66; H, 6.04; N, 14.97. Found: C, 57.46; H, 5.99; N, 14.66.

EXAMPLE 9

*N-[2-isopropyl-3-(carbobenzoxy-nitro-L-arginyl-) carbazoyl]-L-tyrosine*

To 4.12 g. of N-[2-isopropyl-3-(carbobenzoxy-nitro-L-arginyl-)carbazoyl]-O-benzoyl-L-tyrosine ethyl ester in a mixture of 37 cc. of dimethylformamide and 20 cc. of water at 0° is added 30.4 cc. of 1 N sodium hydroxide solution over a period of 5 min. The clear solution is allowed to stand at room temperature for 2 hrs. Dry Ice is then added to adjust the pH to 8 and the solvent is evaporated in vacuo. The residue is dissolved in water and a trace of insoluble material filtered. The solution is cooled to 0°, acidified with 2 N hydrogen chloride solution, the amorphous precipitate filtered and washed with water. Crystallization from methanol-ethylene dichloride yields 2.0 g. (60%) of tiny plates, $[\alpha]_D^{25}=-13.2°$. Recrystallization from the same solvent system gives 1.35 g. (40%) material of $[\alpha]_D^{25°}=-16°$. The analytical sample is crystallized from ethanol-ethylene dichloride, M.P. 116–126° (unsharp), $[\alpha]_D^{25°}=-16°$; $\lambda_{max.}$ 225, 271 m$\mu$ ($\epsilon$=13,000, 16,900). Paper chromatography: $R_f(10)=0.48$. Indicators: $SnCl_2$-diacetyl reagent and $FeCl_3$-$K_3Fe(CN)_6$ spray.

*Analysis.*—Calcd. for $C_{27}H_{36}O_9N_8$: C, 52.59; H, 5.89; N, 18.17. Found: C, 52.53; H, 5.81; N, 18.10.

EXAMPLE 10

*N-[2-isopropyl-3-(carbobenzoxy-nitro-L-arginyl-)carbazoyl]-L-tyrosyl-L-valyl-L-histidyl-L-prolyl-L-phenylalanine methyl ester*

A solution of 1.85 g. of N-[2-isopropyl-3-(carbobenzoxy-nitro-L-arginyl-)carbazoyl]-L-tyrosine and 1.85 g. of L-valyl-L-histidyl-L-prolyl-L-phenylalanine methyl ester in a mixture of 15 cc. of dimethylformamide and 15 cc. of acetonitrile is cooled to 0°. Dicyclohexylcarbodiimide (0.74 g.) in 2 cc. of dimethylformamide is added and the solution allowed to stand at room temperature for 20 hrs. Glacial acetic acid (0.2 cc.) is then added to destroy unreacted dicyclohexyl-carbodiimide and the precipitated dicyclohexylurea (0.47 g.) filtered after 1 hr. The filtrate is evaporated in vacuo (bath temperature <40°), yielding an oily residue which is triturated with ethyl acetate. The solidified material is filtered: yield 3.0 g., $[\alpha]_D^{25°}=-36°$, M.P. 105–109°. This material is distributed in the system methanol-water-chloroform-benzene (3:1:3:1) over 43 transfers, phase volume 20 cc. The contents of tubes 11–24 are combined and evaporated, furnishing 2.0 g. (60%) of the desired product; $[\alpha]_D^{23°}=-43°$; $\lambda_{max.}$ 271 m$\mu$ ($\epsilon$=16,850). Paper chromatography: $R_f(6)=0.15$; $R_f(10)=0.4$. Indicators: $SnCl_2$-diacetyl reagent, $FeCl_3$-$K_3Fe(CN)_6$ and p-nitrobenzenediazonium fluoroborate sprays.

*Analysis.*—Calcd. for $C_{53}H_{70}O_{13}N_{14}\cdot CH_3OH$: C, 56.74; H, 6.53; N, 17.16. Found: C, 56.46; H, 6.27; N, 17.37.

A sample is triturated with ethyl acetate:

*Analysis.*—Calcd. for $C_{53}H_{70}O_{13}N_{14}$: C, 57.29; H, 6.32; N, 17.65. Found: C, 57.60; H, 6.50; N, 17.44.

EXAMPLE 11

*N-[2-isopropyl-3-(nitro-L-arginyl)-carbazoyl]-L-tryosyl-L-valyl-L-histidyl-L-prolyl-L-phenylalanine methyl ester*

N-[2-isopropyl-3-(carbobenzoxy-nitro-L-arginyl)-carbazoyl]-L-tyrosyl-L-valyl-L-histidyl-L-prolyl-L-phenylalanine methyl ester (1.2 g.) is dissolved in 30 cc. of 1.2 N hydrogen bromide in glacial acetic acid and the solution allowed to stand at room temperature for 70 min. Ether is then added, and the precipitate filtered and washed well with ether. The amorphous solid is then dissolved in water and the aqueous solution adjusted to pH 7.5 with dilute sodium bicarbonate solution. Extraction with n-butanol, followed by evaporation of the solvent, affords a residue which is triturated with ethyl acetate; yield 0.825 g. (82%), M.P. 124–130° (foam), $[\alpha]_D^{25°}=-57°$.

This material is shown to be homogeneous by paper chromatography, $R_f(11)=0.5$; $R_f(7)=0.7$. Indicators: $SnCl_2$-diacetyl reagent and $FeCl_3$-$K_3Fe(CN)_6$ spray.

*Analysis.*—Calcd. for $C_{45}H_{64}O_{11}N_{14}$: C, 55.31; H, 6.60; N, 20.07. Found: C, 55.32; H, 6.39; N, 19.50.

EXAMPLE 12

*N-[2-isopropyl-3-(carbobenzoxy-[[β-benzyl]]L-aspartyl-nitro-L-arginyl-)carbazoyl-]L-tyrosyl-L-valyl-L-histidyl-L-prolyl-L-phenylalanine methyl ester*

A solution of 1.2 g. of N-[2-isopropyl-3-(nitro-L-arginyl-carbazoyl)-L-tyrosyl-L-valyl-L-histidyl-L-prolyl-L-phenylalanine methyl ester in a mixture of 7 cc. of dimethylformamide and 8 cc. of acetonitrile is cooled to 0°; 0.412 g. of N,N'-dicyclohexylcarbodiimide in 2 cc. of dimethylformamide followed by 0.628 g. of carbobenzoxy-L-aspartic acid β-benzyl ester in 5 cc. of dimethylformamide is then added. The solution is allowed to stand at room temperature for 16 hours, when 0.2 cc. of glacial acetic acid is added. The mixture is stirred at room temperature for one hour and the N,N'-dicyclohexylurea filtered (0.217 g., M.P. 229–231°). Concentration of the filtrate yields a residue which is triturated with ethyl acetate. The resulting solid is filtered and dried in vacuo at 50° C.; yield 1.5 g. (91%); $[\alpha]_D^{24}=-38°$. Paper chromatography: $R_f(16)=0.7$. Indicators:

$$FeCl_3—K_3Fe(CN)_6$$

and p-nitrobenzenediazonium fluoroborate sprays.

For analysis a sample is precipitated from ethanol-ester, M.P. 136–142°; $[\alpha]_D^{23}=-39.6°$.

*Analysis.*—Calcd. for $C_{64}H_{81}O_{16}N_{15}\cdot H_2O$: C, 57.61; H, 6.27; N, 15.75. Found: C, 57.29; H, 6.35; N, 15.56.

EXAMPLE 13

*N-[2-isopropyl-3-(L-aspartyl - L - arginyl)-carbazoyl]-L-tyrosyl-L-valyl-L-histidyl-L-prolyl-L-phenylalanine*

To 1.2 g. of N-[2-isopropyl-3-(carbobenzoxy-[[β-benzyl-]]L-aspartyl-nitro - L - arginyl-)carbazoyl]-L-tyrosyl-L-valyl-L-histidyl-L-prolyl-L-phenylalanine methyl ester in 25 cc. of ethanol is added 0.7 cc. of 5.3 N methanolic hydrogen chloride solution and 0.220 g. of 5% palladium on carbon catalyst. The mixture is hydrogenated at room temperature and atmospheric pressure for 48 hrs., when hydrogen uptake ceases. The catalyst is then filtered, washed well with methanol and the filtrate evaporated. The residue (0.862 g.) is dissolved in 5 cc. of conc. hydrochloric acid and the solution held at 40° for one hour. Evaporation yields 0.82 g. residue, $[\alpha]_D^{24}=-16.5°$, which is subjected to a 50 transfer countercurrent distribution in the system n-butanol-water (phase volume 10 cc.). Fractions 0–6 (0.3 g.) are combined (the later fractions contain additional material of the same polarity as shown by paper chromatography), dissolved in water and filtered through a polystyreneamine anion exchange resin in the acetate cycle (Amberlite CG–45, available from the Rohm and Haas Company, of Philadelphia). Evaporation of the water furnishes 0.258 g. material, which is now further purified by countercurrent distribution in the system s.-butanol-water (100 transfers). The contents of tubes 11–22, upon evaporation, furnish 0.111 g. of pure octapeptide, $[\alpha]_D^{24°}=-33°$ (water). This material is demonstrated to be homogeneous by paper electrophoresis and also by paper chromatography, $R_f(9)=0.38$; $R_f(14)=0.3$; $R_f(17)=0.19$. Indicators: $FeCl_3$-$K_3Fe(CN)_6$ and p-nitrobenzenediazonium fluoroborate sprays.

For total acid hydrolysis 2 mg. of the peptide is hydrolyzed with half concentrated HCl at 115° for 24 hrs. The solution is then evaporated to dryness and chromatographed in the system n-butanol-acetic acid-water (5:1:4) on Whatman paper Nos. 1 and 4. The paper chromatograms are developed with ninhydrin and the individual spots eluted with 1:1 mixture of n-propanol-water. Measurement of the absorption at 565 mμ, when compared with that of a mixture of the expected amino acids of similar concentration and chromatographed and developed in the same day, shows the presence of aspartic acid, arginine, tyrosine, valine, histidine and phenylalanine in approximately equimolar ratios. Proline, also present, is not determined.

EXAMPLE 14

*N-[2-isopropyl-3-(L-arginyl-)-carbazoyl]-L-tyrosyl-L-valyl-L-histidyl-L-prolyl-L-phenylalanine*

To a solution of 0.96 g. of N-[2-isopropyl-3-(carbobenzoxy-nitro - L - arginyl-)carbazoyl]-L-tyrosyl-L-valyl-L-histidyl-L-prolyl-L-phenylalanine methyl ester (Example 10) in 20 cc. of methanol is added 0.64 cc. of 5.3 N methanolic HCl, followed by 0.214 g. of 5% palladium on carbon catalyst. The stirred mixture is hydrogenated at room temperature and one atmosphere hydrogen pressure for 41 hrs. The catalyst is then filtered and the filtrate concentrated in vacuo to obtain 0.786 g. Paper chromatography (system 9) reveals two new spots. This material is dissolved in 6 cc. of conc. HCl and held at 40° for one hour. Subsequent evaporation to dryness in vacuo yields 0.84 g. of residue, which is dissolved in minimum water and passed through a short column of Amberlite anion exchange resin CG–45 in the acetate cycle. Evaporation of the effluent in vacuo gives 0.675 g. of a residue which exhibits two strong spots in paper chromatography (system 9), $R_f$: 0.55; 0.45. This material is now distributed in the countercurrent system: sec. butanol-water (70 transfers) and each tube (phase volume 10 cc.) is isolated separately. The more polar material, fraction I, is found in tubes 15–22 (0.223 g.), while the less polar material, fraction II, is isolated from tubes 23–40. Fraction I is identified as the desired product by its activity on the isolated guinea pig ileum, and is consequently held for further purification. Fraction II (0.276 g.) is identified as the nitro-arginyl-heptapeptide by its strong ultraviolet absorption at 270 mμ, $\epsilon=12,500$ (material from tubes 28–29, 55 mg., $[\alpha]_D^{24}=-37°$ (methanol)) and lack of activity on the isolated guinea pig ileum. This identification is corroborated by further reduction of fraction II to biologically active product which exhibits the same $R_f$ value as fraction I.

Fraction I is once more subjected to the countercurrent system: sec. butanol-water (100 transfers), and pure material is isolated from tubes 21–28 (0.067 g.); $[\alpha]_D^{24}=-29°$ (methanol). (A further 50-transfer countercurrent distribution in the system: sec. butanol-0.5% acetic acid does not increase the activity when the substance isolated from tubes 3–7 is tested on the isolated guinea pig ileum.) This material is seen to be homogeneous by paper electrophoresis and by paper chromatography on systems (9), (14) and (17) $R_f$: 0.45; 0.7; and 0.55, respectively. Indicators: $FeCl_3$-$K_3Fe(CN)_6$ and p-nitrobenzene diazonium fluoroborate sprays.

Total acid hydrolysis at 115° for 24 hours establishes the presence of arginine, tyrosine, valine, histidine and phenylalanine in approximately equimolar ratio; proline, also present, is not determined.

Fraction II (0.276 g.) is dissolved in 13 cc. of methanol, and 0.40 cc. of 5.3 N methanolic HCl is added, followed by 0.064 g. of 5% paladium on carbon catalyst. After hydrogenation for 40 hrs. the catalyst is filtered and the filtrate concentrated in vacuo. The residue, 0.236 g., $[\alpha]_D^{24}=-30°$ (methanol), is dissolved in 2 cc. of water and passed through a column of Amberlite anion exchange resin CG–45 in the acetate form. The effluent, evaporated, gives 0.260 g. of material which is purified by countercurrent distribution in the system: sec. butanol —0.5% acetic acid (100 transfers). Tubes 12–22 combined, 0.140 g., furnish material identical with purified fraction I, as shown by paper chromatography, rotation, electrophoresis and biological activity.

EXAMPLE 15

*N-[2-isopropyl-3-(t-butyloxycarbonyl)-carbazoyl]-L-tyrosine*

To a solution of 3.4 g. of N-[2-isopropyl-3-(t-butyloxycarbonyl)-carbazoyl-]O-benzoyl-L-tyrosine ethyl ester (Example 5) in 25 cc. of methanol at 0° is added 19.8 cc. of 1 N sodium hydroxide solution, and the mixture is stirred at room temperature for 2 hrs. It is then cooled to 0°, the pH adjusted to 3 with dilute hydrochloric acid solution, and the mixture extracted with 4× 30 cc. portions of ethyl acetate. The combined extracts are washed with water and dried over anhydrous sodium sulfate. Evaporation of the solvent yields an amorphous residue which is dissolved in 10 cc. of methylene chloride and crystallized by addition of cyclohexane; yield 2.2 g. (91%), M.P. 64.5–67.5° (foam), $[\alpha]_D=+20°$. Paper chromatography: $R_f(8)=0.50$. Indicator:

$FeCl_3$-$K_3Fe(CN)_6$

EXAMPLE 16

*N-[2-isopropyl-3-(t-butyloxycarbonyl)-carbazoyl]-L-tyrosyl-L-valine methyl ester*

A solution of 223 g. of N-[2-isopropyl-3-(t-butyloxycarbonyl)-carbazolyl]-L-tyrosine in 30 cc. of tetrahydrofuran is cooled to 0°. L-valine methyl ester (0.79 g.) dissolved in 10 cc. of tetrahydrofuran is then added, followed by 1.24 g. of N,N'-dicyclohexylcarbodiimide in 10 cc. of tetrahydrofuran. The mixture is allowed to stand at room temperature for 18 hrs., when the precipitated N,N'-dicyclohexylurea (0.950 g.) is filtered and the solvent evaporated. The resulting residue is dissolved in acetone, insoluble material filtered, and the acetone removed in vacuo. The residual foam (3.06 g.) is crystallized from ethylacetate n-hexane, yielding 2.0 g. (70%) of the protected tripeptide, M.P. 134.5–137°. The analytical sample is recrystallized once more from ethyl acetate-n-hexane, M.P. 135–136°, $[\alpha]_D^{24}=-6°$. Paper chromatography: $R_f(8)=0.9$; $R_f(10)=0.9$. Indicator: $FeCl_3$ - $K_3FeCN_6$ spray.

*Analysis.*—Calcd. for $C_{24}H_{38}N_4O_7$: C, 58.27; H, 7.74; N, 11.32. Found: C, 58.43; H, 7.71; N, 11.44.

EXAMPLE 17

*N-[2-isopropyl-(3-t-butyloxycarbonyl-)carbazoyl]-L-tyrosyl-L-valine*

A solution of 4.94 g. of N-[2-isopropyl-3-(t-butyloxycarbonyl)-carbazoyl]-L-tyrosyl-L-valine methyl ester in 100 cc. of methanol is cooled to 0° and 30 cc. of 1 N sodium hydroxide added with stirring. The mixture is allowed to stand at room temperature for 4 hrs., acidified with dilute HCl to pH 4 after addition of 200 cc. of water, and then extracted with ethyl acetate several times. The combined extracts are washed with water, dried with anhydrous sodium sulfate, and the solvent evaporated in vacuo. The residue crystallizes when triturated with ethyl acetate-n-hexane, yielding 3.77 g. (79%) of the N-protected tripeptide, M.P. 61–65°, $[\alpha]_D^{24}=-5°$. Paper chromatography: $R_f(8)=0.3$; $R_f(11)=0.5$. Indicator:

$FeCl_3$-$K_3Fe(CN)_6$ spray.

*Analysis.*—Calcd. for $C_{23}H_{36}O_7N_4$: C, 57.48; H, 7.55; N, 11.66. Found: C, 57.74; H, 7.80; N, 11.79.

EXAMPLE 18

*N-[2-isopropyl - 3 - (t-butyloxycarbonyl)-carbazoyl]-L-tyrosyl - L - valyl-L-histidyl-L-prolyl-L-phenylalanine methyl ester*

N-[2-isopropyl - 3 - (t-butyloxycarbonyl)-carbazoyl]-L-tyrosyl-L-valine (4.8 g.) is dissolved in 150 cc. of tetrahydrofuran and cooled to 0°. L-histidyl-L-prolyl-L-phenylalanine methyl ester, 4.56 g., is then dissolved in 80 cc. of tetrahydrofuran, and the two solutions are combined. 2.06 g. of N,N'-dicyclohexylcarbodiimide in 50 cc. of tetrahydrofuran is now added at 0°, and the resulting solution stored at room temperature for 18 hrs. Precipitated N,N'-dicyclohexylurea (0.8 g.) is filtered and the solvent evaporated in vacuo (<45°). The residual foam is dissolved in acetone, additional (0.53 g.) N,N'-dicyclohexylurea filtered, and the solvent evaporated again. The residue, 9.2 g., is precipitated from ethyl acetate-n-hexane, furnishing 5.86 g. (67%) of the protected hexapeptide. A further precipitation from the same solvent system gives 4.53 g. product of M.P. 136–139° (foam) $[\alpha]_D^{24}=-36°$. Paper chromatography: $R_f(8)=0.55$; $R_f(6)=0.68$. Indicator: $FeCl_3$-$K_3FeCN_6$ and p-nitrobenzenediazonium fluoroborate sprays.

*Analysis.*—Calcd. for $C_{44}H_{61}N_9O_{10}$: C, 60.32; H, 7.02; N, 14.40. Found: C, 60.50; H, 6.85; N, 14.60.

EXAMPLE 19

*N-(2-isopropyl-carbazoyl)-L-tyrosyl-L-valyl-L-histidyl-L-prolyl-L-phenylalanine*

To a solution of 1.4 g. of N-[2-isopropyl-3-(t-butyloxycarbonyl)-carbazoyl-]L-tyrosyl-L-valyl - L - histidyl-L-prolyl-L-phenylalanine methyl ester in 10 cc. of methanol at 0° is added 4.8 cc. of 1 N sodium hydroxide solution and the mixture is stirred at room temperature for 4 hrs. Water is then added, and the solution is adjusted to pH 4 and extracted several times with ethyl acetate containing methanol. The combined extracts are washed with water, dried with anhydrous sodium sulfate, and the solvent evaporated. The residue (1.25 g.) is triturated with ethyl acetate, affording 1.07 g. of the N-terminal protected hexapeptide, M.P. 160–168°; $[\alpha]_D^{24}=-14°$.

To remove the N-terminal protecting group, 0.5 g. of this material is dissolved in 6 cc. of 6 N hydrochloric acid in dioxane and the solution allowed to stand at room temperature for 15 minutes. Ether (20 cc.) is then added, and the precipitate filtered, washed well with ether and dried over $P_2O_5$; yield 0.47 g., M.P. 166–174° (foam); $[\alpha]_D^{24}=-14°$.

The dihydrochloride is dissolved in 10 cc. of water and then passed through a small column containing 4 g. of Amberlite phenolic amine anion exchange resin IR–4B (available from Rohm and Haas). The aqueous effluent is concentrated in vacuo (bath temp. <45°) and the residue dissolved in ethanol. Precipitation with ether, filtration, and drying over $P_2O_5$ yield 0.3 g. of the desired hexapeptide, M.P. 182–186° (foam). Precipitation from ethanol-ether gives material of the same M.P., $[\alpha]_D^{24}=-25°$. Paper chromatography: $R_f(7)=0.8$; $R_f(11)=0.55$; $R_f(14)=0.62$; $R_f(15)=0.75$. Indicators:

$FeCl_3$—$K_3Fe(CN)_6$ and p-nitrobenzenediazonium fluoroborate sprays.

*Analysis.*—Calcd. for $C_{38}H_5N_9O_8 \cdot H_2O$: C, 58.52; H, 6.85; N, 16.17. Found: C. 58.39; H, 6.86; N, 15.84.

Total hydrolysis with 1:1 conc. hydrochloric acid: water at 115° for 24 hrs. and subsequent quantitative amino acid determination show the presence of tyrosine, valine, histidine and phenylalanine in approximately equimolar ratios. Proline, also present, is not determined.

EXAMPLE 20

*Carbobenzoxy-L-histidyl-L-prolyl-L-phenylalanine methyl ester*

A solution of 8.48 g. of carbobenzoxy-L-histidine hydrazide in 83.7 cc. of 1 N hydrochloric acid is mixed with 100 cc. of ethyl acetate and cooled to 0°. An ice-cold solution of 1.93 g. of sodium nitrite in 8 cc. of water is then added. After two minutes, 38 cc. of cold 50% potassium carbonate is added, the mixture shaken vigorously and the ethyl acetate layer separated. The aqueous phase is extracted with 20 cc. of ethyl acetate and the combined extracts dried with sodium sulfate and filtered. To this solution is added at 0°, 7.7 g. of L-prolyl-L-phenylalanine methyl ester in 20 cc. of ethyl acetate and the new solution stored at 0° for 5 hours and then at room temperature for 15 hours. A small amount of precipitate is filtered off, the solution washed with water, dried with sodium sulfate and the solvent evaporated, yielding 14.0 g. (91%) of the desired product in the form of a foamy residue, $[\alpha]_D^{25}=-34°$ (acetone). Paper chromatography: $R_f(3)=0.20$. Indicator: p-nitrobenzenediazonium fluoroborate spray. A sample triturated with n-hexane-ethyl acetate melts at 65–70°, $[\alpha]_D^{25}=-35°$ (acetone).

*Analysis.*—Calcd. for $C_{29}H_{33}N_5O_6$: C, 63.60; H, 6.07; N, 12.79. Found: C, 63.60; H, 6.37; N, 12.59.

EXAMPLE 21

*L-histidyl-L-prolyl-L-phenylalanine methyl ester dihydrobromide*

A solution of 13.5 g. of carbobenzoxy-L-histidyl-L-prolyl-L-phenylalanine methyl ester (Example 20) in 152 cc. of 1.2 N HBr in glacial acetic acid is stored at room temperature for 90 minutes. It is then poured into 1.5 liters of ether and the precipitated solids are filtered, washed well with ether and dried over phosphorus pentoxide. The hygroscopic material is dissolved in cold methanol and then precipitated with ethyl acetate to yield 11.9 g. (82%) of crystalline product, M.P. 170–174°, $[\alpha]_D^{24}=-39°$ ($H_2O$). The analytical sample is recrystallized once more from methanol-ethyl acetate, M.P. 169–171°, $[\alpha]_D^{24}=-38°$ ($H_2O$). Paper chromatography: $R_f(6)=0.44$. Indicator: n-nitrobenzenediazonium fluoroborate spray.

*Analysis.*—Calcd. for $C_{21}H_{27}N_5O_4$: C, 42.44; H, 5.43; N, 11.69; Br, 26.89. Found: C, 42.38; H, 5.39; N, 11.93; Br, 26.89.

EXAMPLE 22

*L-histidyl-L-prolyl-L-phenylalanine methyl ester*

The dihydrobromide prepared in Example 21 (6 g.) is dissolved in 15 cc. of water, 50 cc. of chloroform is added and the mixture cooled to 0°. It is then transferred into a precooled separating funnel, 20 cc. of ice-cold, saturated potassium carbonate solution added, the mixture shaken vigorously and the chloroform layer separated. The water phase is extracted twice with 20 cc. of chloroform. The combined extracts are washed with saturated sodium chloride solution, dried over sodium sulfate, and the solvent evaporated, furnishing a 4.2 g. (100%) of the desired product as a fluffy residue, suitable for use in the procedure of Example 18.

EXAMPLE 23

The following intermediates are prepared from hydrazines of the formula $RNHNH_2$ by condensation with the appropriate keto compound according to the procedure of Example 1, followed by hydrogenation as described in Example 2.

$RNHNHR^1$

| R | $R^1$ |
|---|---|
| t-Butyloxycarbonyl | p-Hydroxybenzyl |
| Formyl | Benzyl |
| Cyclopentyloxycarbonyl | p-Hydroxybenzyl |
| Cyclohexyloxycarbonyl | Sec-butyl |
| Cyclohexyloxycarbonyl | Isobutyl |
| Acetyl | Methyl |
| t-Butyloxycarbonyl | Ethyl |
| t-Butyloxycarbonyl | n-Butyl |
| Formyl | 3-indolylmethyl |
| Formyl | 5-imidazolylmethyl |
| Formyl | Carbamylmethyl |
| Formyl | 2-carbamylethyl |
| t-Butyloxycarbonyl | Carbomethoxymethyl |
| t-Butyloxycarbonyl | 2-carbethoxyethyl |
| t-Butyloxycarbonyl | 3-carbethoxypropyl |
| Cyclopentyloxycarbonyl | p-Methoxybenzyl |
| Cyclopentyloxycarbonyl | p-Acetoxybenzyl |
| t-Butyloxycarbonyl | Benzyl |
| t-Butoxycarbonyl | Sec-butyl |
| t-Butoxycarbonyl | Isobutyl |
| Cyclohexyloxycarbonyl | 4-[N-(cyclohexyloxycarbonyl)amino] butyl |
| Cyclopentyloxycarbonyl | 4-[N-(cyclopentyloxycarbonyl)-amino]butyl |
| t-Butoxycarbonyl | Carbo-t-butoxymethyl |

EXAMPLE 24

The following intermediates are prepared from carbazates of the formula $RNHNH_2$ by condensation with the appropriate chloride $R^1Cl$. In each case, one equivalent of the halide is combined in toluene with from three to ten equivalents of the carbazate, and the reaction mixture is heated at 100° for 18 hours. The solvent is then evaporated at reduced pressure, and the residue is taken up in ethyl acetate or chloroform and water-washed. Re-evaporation of solvent provides the product as residue. Purification by fractionation or crystallization from alcohol, hexane or other solvent may be effected if desired. In place of the chloride $R^1Cl$, the corresponding bromide or tosylate may be employed.

$RNHNHR^1$

| R | $R^1$ |
|---|---|
| t-Butyloxycarbonyl | 3-p-tolylsulfonamidopropyl |
| Cyclopentyloxycarbonyl | 3-p-tolylsulfonamidopropyl |
| Cyclohexyloxycarbonyl | 3-p-tolylsulfonamidopropyl |
| t-Butyloxycarbonyl | 2-p-tolylsulfonamidoethyl |
| Formyl | 2-p-tolylsulfonamidoethyl |
| Tosyl | $NO_2NHC(:NH)NH(CH_2)_3-$ |
| t-Butyloxycarbonyl | $C_6H_5CH_2O.CO.NHC(:NH)NH(CH_2)_3-$ |
| t-Butyloxycarbonyl | $CH_3C_6H_4SO_2NHC(:NH)NH(CH_2)_3-$ |
| Cyclohexyloxycarbonyl | 2-[N-(cyclohexyloxycarbonyl)amino] ethyl |
| Cyclopentyloxycarbonyl | 2-[N-(cyclopentyloxycarbonyl) amino]ethyl |
| Benzyloxycarbonyl | sec-butyl |

EXAMPLE 25

The following isocyanates are prepared by treating the appropriate amino acid esters, in the form of the hydrochloride, with phosgene by the procedure of Example 4. Alternatively, the phosgene is replaced by trichloromethylchloroformate (diphosgene) in the procedure of the earlier example.

$OCN-CHR^2-COR^3$

| $R^2$ | $R^3$ |
|---|---|
| S-Butyl | Methoxy |
| Benzyl | Methoxy |
| S-Butyl | Ethoxy |
| Benzyl | Ethoxy |
| Isopropyl | Ethoxy |
| Benzyl | Methoxy |
| Isobutyl | Ethoxy |
| Isobutyl | Propoxy |
| H | Methoxy |
| Methyl | Isobutoxy |
| Ethyl | Methoxy |
| n-Butyl | Methoxy |
| 3-indolylmethyl | Methoxy |
| 5-imidazolylmethyl | Methoxy |
| 3-ureidopropyl | Methoxy |
| Methoxymethyl | Methoxy |
| Ethoxyethyl | Isopropoxy |
| Benzyloxyethyl | Ethoxy |
| Acetoxyethyl | Ethoxy |
| Benzylmercaptomethyl | Ethoxy |
| 2-benzylmercaptoethyl | Ethoxy |
| 2-methylmercaptoethyl | Ethoxy |
| p-Ethoxybenzyl | Ethoxy |
| p-Benzyloxybenzyl | Ethoxy |
| 2-carbomethoxyethyl | Methoxy |
| Carbomethoxymethyl | Methoxy |
| 2-carbethoxyethyl | Methoxy |
| 4-p-tolylsulfonamidobutyl | Methoxy |
| $NO^2NHC(:NH)NH(CH_2)_3-$ | Methoxy |
| 2-[N-(cyclohexyloxycarbonyl)amino]ethyl | Methoxy |
| Benzyloxybenzyl | Methoxy |
| p-Acetoxybenzyl | Methoxy |

EXAMPLE 26

The products of Examples 4 and 25 are condensed with the substituted hydrazines of Examples 23 and 24, as well as with the hydrazines of the formula $RNHNH_2$ which furnish the starting compounds of those earlier examples, according to the procedure of Example 5, to prepare the above substances.

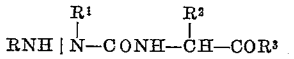

| R | R¹ | R² | R³ |
|---|---|---|---|
| t-Butyloxycarbonyl | p-Hydroxybenzyl | s-Butyl | Methoxy |
| cyclohexyloxycarbonyl | H | Benzyl | Methoxy |
| Formyl | Benzyl | s-Butyl | Ethoxy |
| Cyclopentyloxycarbonyl | p-Hydroxybenzyl | Benzyl | Ethoxy |
| Cyclopentyloxycarbonyl | p-Hydroxybenzyl | Isopropyl | Ethoxy |
| t-Butoxycarbonyl | Sec-butyl | p-Benzoyloxybenzyl | Ethoxy |
| t-Butoxycarbonyl | Isopropyl | Benzyl | Methoxy |
| t-Butoxycarbonyl | Isobutyl | Isobutyl | Ethoxy |
| t-Butoxycarbonyl | Isopropyl | Isobutyl | Propoxy |
| t-Butyloxycarbonyl | 3-p-tolylsulfonamidopropyl | H | Methoxy |
| Cyclopentyloxycarbonyl | H | Methyl | Isobutoxy |
| Cyclohexyloxycarbonyl | H | Ethyl | Methoxy |
| t-Butyloxycarbonyl | 2-p-tolylsulfonamidoethyl | n-Butyl | Methoxy |
| Formyl | H | 3-indolylmethyl | Methoxy |
| Tosyl | $NO^2NHC(:NH)NH(CH_2)_3$— | 5-imidazolylmethyl | Methoxy |
| t-Butyloxycarbonyl | H | 3-ureidopropyl | Methoxy |
| t-Butyloxycarbonyl | H | Methoxymethyl | Methoxy |
| Benzyloxycarbonyl | Sec-butyl | 2-ethoxyethyl | Isopropoxy |
| Benzyloxycarbonyl | H | Benzyl | Methoxy |
| Cyclohexyloxycarbonyl | Sec-butyl | Ethoxyethyl | Isopropoxy |
| Tosyl | Isobutyl | Benzyloxyethyl | Ethoxy |
| Acetyl | Methyl | Acetoxyethyl | Ethoxy |
| t-Butyloxycarbonyl | Ethyl | Benzylmercaptomethyl | Ethoxy |
| t-Butyloxycarbonyl | n-Butyl | 2-benzylmercaptoethyl | Ethoxy |
| Formyl | 3-indolylmethyl | 2-methylmercaptoethyl | Ethoxy |
| Formyl | 5-imidazolylmethyl | p-Ethoxybenzyl | Ethoxy |
| Formyl | Carbamylmethyl | p-Benzyloxybenzyl | Ethoxy |
| Formyl | 2-carbamylethyl | p-Benzoyloxybenzyl | Ethoxy |
| t-Butyloxycarbonyl | 2-carbethoxyethyl | 2-carbomethoxyethyl | Methoxy |
| t-Butyloxycarbonyl | 3-carbethoxypropyl | Carbomethoxymethyl | Methoxy |
| Cyclopentyloxycarbonyl | p-Methoxybenzyl | 2-carbethoxyethyl | Methoxy |
| Cyclopentyloxycarbonyl | p-Acetoxybenzyl | 4-p-tolylsulfonamidobutyl | Methoxy |
| t-Butyloxycarbonyl | 4-p-tolylsulfonamidobutyl | $NO_2NHC(:NH)NH(CH_2)_3$— | Methoxy |
| t-Butyloxycarbonyl | $C_6H_5CH_2O.CO.NHC$—$(:NH)NH(CH_2)_3$— | s-Butyl | Methoxy |
| Acetyl | Methyl | 2-[N-(cyclohexyloxy-carbonyl)amino]ethyl | Methoxy |
| Cyclohexyloxycarbonyl | H | Benzyloxybenzyl | Methoxy |
| t-Butyloxycarbonyl | p-Hydroxybenzyl | $NO_2NHC(:NH)NH$—$(CH_2)_3$ | Methoxy |
| Cyclohexylcarbonyl | 4-[N-(cyclohexyloxycarbonyl) amino]butyl | Benzyl | Methoxy |
| Cyclopentyloxycarbonyl | 4-[N-(cyclopentyloxycar-bonyl)amino]butyl | Benzyl | Methoxy |
| Cyclohexyloxycarbonyl | 2-[N-(cyclohexyloxycarbonyl) amino]ethyl | s-Butyl | Methoxy |
| Cyclopentyloxycarbonyl | 2-[N-(cyclopentyloxycar-bonyl)amino]ethyl | s-Butyl | Methoxy |
| t-Butoxycarbonyl | Carbo-t-butoxymethyl | p-Acetoxybenzyl | Methoxy |

EXAMPLE 27

Those products of Example 26 wherein R is formyl or t-butoxycarbonyl are treated with 6 N hydrochloric acid as described in Example 6 and Example 19, to remove the N-terminal protecting group. In this manner, the following compounds are prepared:

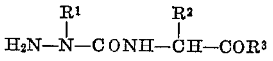

| R¹ | R² | R³ |
|---|---|---|
| p-Hydroxybenzyl | s-Butyl | Methoxy |
| Benzyl | s-Butyl | Ethoxy |
| Sec-butyl | p-Benzoyloxybenzyl | Ethoxy |
| Isopropyl | Benzyl | Methoxy |
| Isobutyl | Isobutyl | Ethoxy |
| Isopropyl | Isobutyl | Propoxy |
| 3-p-tolylsulfonamidopropyl | H | Methoxy |
| 2-p-tolylsulfonamidoethyl | n-Butyl | Methoxy |
| H | 3-indolylmethyl | Methoxy |
| H | 3-ureidopropyl | Methoxy |
| H | Methoxymethyl | Methoxy |
| Ethyl | Benzylmercaptomethyl | Ethoxy |
| n-Butyl | 2-benzylmercaptoethyl | Ethoxy |
| 3-indolylmethyl | 2-methylmercaptoethyl | Ethoxy |
| 5-imidazolylmethyl | p-Ethoxybenzyl | Ethoxy |
| Carbamylmethyl | p-Benzyloxybenzyl | Ethoxy |
| 2-carbamylethyl | p-Benzoyloxybenzyl | Ethoxy |
| 2-carbethoxyethyl | 2-carbomethoxyethyl | Methoxy |
| 3-carbethoxypropyl | Carbomethoxymethyl | Methoxy |
| 4-p-tolylsulfonamidobutyl | $NO_2NHC(:NH)NH(CH_2)_3$— | Methoxy |
| $C_6H_5CH_2O.CO.NHC(:NH)NH$ $(CH_2)_3$— | s-Butyl | Methoxy |
| p-Hydroxybenzyl | $NO_2NHC(:NH)NH(CH_2)_3$— | Methoxy |

EXAMPLE 28

The following compounds are prepared in the form of their hydrobromide salts from the corresponding compounds of Example 26 having an amino group protected by cyclopentyloxycarbonyl, cyclohexyloxycarbonyl or benzyloxycarbonyl. Conversion is effected by treatment with HBr in acetic acid as described in Examples 3 and 11. In the case of cyclohexyloxycarbonyl groups the reaction is conducted at 60° C., instead of at room temperature as in those earlier examples. These procedures simultaneously cleave any alkyl ether, benzyl ether or t-butyloxycarbonyl groups present.

$$RNH-N(R^1)-CONH-CH(R^2)-COR^3$$

| R | $R^1$ | $R^2$ | $R^3$ |
|---|---|---|---|
| H | H | Benzyl | Methoxy |
| H | p-Hydroxybenzyl | Benzyl | Ethoxy |
| H | p-Hydroxybenzyl | Isopropyl | Ethoxy |
| H | H | Methyl | Isobutoxy |
| H | H | Ethyl | Methoxy |
| H | Sec-butyl | 2-hydroxyethyl | Isopropoxy |
| H | p-Hydroxybenzyl | 2-carbethoxyethyl | Methoxy |
| H | p-Acetoxybenzyl | 4-p-tolylsulfonamidobutyl | Methoxy |
| H | $H_2NC(:NH)NH(CH_2)_3$ | s-Butyl | Methoxy |
| Acetyl | Methyl | 2-aminoethyl | Methoxy |
| H | H | p-Hydroxybenzyl | Methoxy |
| H | 4-aminobutyl | Benzyl | Methoxy |
| H | 2-aminoethyl | s-Butyl | Methoxy |

For quantitative cleavage of alkyl ethers other than t-butyl ethers, it is sometimes necessary to prolong the HBr treatment or to conduct the reaction at 100°.

EXAMPLE 29

Tosyl protecting groups are cleaved from the products of Example 26 by treating a solution of the starting compound in liquid ammonia with sodium to a 30-second blue end point. Ammonium chloride equivalent to the added sodium is then introduced and the ammonia permitted to evaporate. The residue is washed with ice-water and dried. Any benzyl thioether groups present are simultaneously cleaved, as are benzyloxycarbonyl amino protecting groups.

EXAMPLE 30

The following compounds are prepared by reduction of the corresponding products of Examples 26 and 27 which contain nitro-substituted 3-guanidylpropyl groups. The procedure followed is palladium-catalyzed hydrogenolysis according to the method of Examples 13 and 14. Any benzyloxycarbonyl amino-protecting groups or benzyl ether groups present are simultaneously cleaved.

$$RNH-N(R^1)-CONH-CH(R^2)-COR^3$$

| R | $R^1$ | $R^2$ | $R^3$ |
|---|---|---|---|
| Tosyl | 3-guanidylpropyl | 5-imidazolylmethyl | Methoxy |
| t-Butyloxycarbonyl | 4-p-tolylsulfonamidobutyl | 3-guanidylpropyl | Methoxy |
| H | 4-p-tolylsulfonamidobutyl | 3-guanidylpropyl | Methoxy |
| t-Butyloxycarbonyl | p-Hydroxybenzyl | 3-guanidylpropyl | Methoxy |
| H | p-Hydroxybenzyl | 3-guanidylpropyl | Methoxy |

EXAMPLE 31

The following compounds are prepared from corresponding products of the previous examples wherein $R^3$ is alkoxy, by dissolving the starting compound in alcohol saturated with ammonia, permitting the solution to stand at room temperature until the reaction is substantially complete (24–48 hours usually suffice), and then evaporating the alcohol under reduced pressure. Carboxylic ester groups present elsewhere in the molecule are simultaneously converted to amide groups. The products may be purified if desired by trituration with a solvent such as hexane, ether or ethyl acetate, or by recrystallization from solvent systems such as ethyl acetate-hexane, alcohol-water or dimethylformamide-ether.

EXAMPLE 32

The products of Examples 26–30 are converted to the corresponding free carboxylic acids by the acid hydrolysis procedure of Examples 13 and 14, with subsequent treatment with anion exchange resin as before. Any formyl, cyclopentyloxycarbonyl, benzyloxycarbonyl or t-butyloxycarbonyl protective groups present are simultaneously cleaved.

Alternatively, the basic hydrolysis procedure of Examples 9, 15, 17 and 19 is applied, employing 0.2–0.5 N sodium hydroxide in methanol-water or dimethylformamide-water as in those earlier examples. To recover the product, the reaction mixture is neutralized and then extracted into ethyl acetate as before. This hydrolytic pro- $$RNH—\overset{R^1}{\underset{|}{N}}—CONH—\overset{R^2}{\underset{|}{CH}}—CONH_2$$

| R | $R^1$ | $R^2$ |
|---|---|---|
| t-Butyloxycarbonyl | Isopropyl | p-Hydroxybenzyl |
| H | Isopropyl | p-Hydroxybenzyl |
| t-Butyloxycarbonyl | p-Hydroxybenzyl | s-Butyl |
| Cyclohexyloxycarbonyl | H | Benzyl |
| Formyl | Benzyl | s-Butyl |
| Cyclopentyloxycarbonyl | p-Hydroxybenzyl | Benzyl |
| Cyclopentyloxycarbonyl | p-Hydroxybenzyl | Isopropyl |
| t-Butyloxycarbonyl | s-Butyl | p-Hydroxybenzyl |
| t-Butyloxycarbonyl | Isopropyl | Benzyl |
| t-Butyloxycarbonyl | Isobutyl | Isobutyl |
| t-Butyloxycarbonyl | Isopropyl | Isobutyl |
| t-Butyloxycarbonyl | 3-p-tolylsulfonamidopropyl | H |
| Cyclopentyloxycarbonyl | H | Methyl |
| Cyclohexyloxycarbonyl | H | Ethyl |
| t-Butyloxycarbonyl | 2-p-tolylsulfonamidoethyl | n-Butyl |
| Formyl | H | 3-indolylmethyl |
| t-Butyloxycarbonyl | H | 3-ureidopropyl |
| t-Butyloxycarbonyl | H | Methoxymethyl |
| Cyclohexyloxycarbonyl | s-Butyl | Ethoxyethyl |
| Tosyl | Isobutyl | Benzyloxyethyl |
| Acetyl | Methyl | Hydroxyethyl |
| t-Butyloxycarbonyl | Ethyl | Benzylmercaptomethyl |
| t-Butyloxycarbonyl | n-Butyl | 2-benzylmercaptoethyl |
| Formyl | 3-indolylmethyl | 2-methylmercaptoethyl |
| Formyl | 5-imidazolylmethyl | p-Ethoxybenzyl |
| Formyl | Carbamylmethyl | p-Benzyloxybenzyl |
| Formyl | 2-carbamylethyl | p-Hydroxybenzyl |
| t-Butyloxycarbonyl | 2-carbamylethyl | 2-carbamylethyl |
| t-Butyloxycarbonyl | 3-carbamylpropyl | Carbamylmethyl |
| Cyclopentyloxycarbonyl | p-Methoxybenzyl | 2-carbamylethyl |
| Cyclopentyloxycarbonyl | p-Hydroxybenzyl | 4-p-tolylsulfonamidobutyl |
| t-Butyloxycarbonyl | $C_6H_5CH_2O.CO.NHC(:NH)NH(CH_2)_3—$ | s-Butyl |
| Acetyl | Methyl | 2-[N-(cyclohexyloxycarbonyl)-amino]ethyl |
| Cyclohexyloxycarbonyl | H | Benzyloxybenzyl |
| H | p-Hydroxybenzyl | s-Butyl |
| H | Benzyl | s-Butyl |
| H | s-Butyl | p-Hydroxybenzyl |
| H | Isopropyl | Benzyl |
| H | Isobutyl | Isobutyl |
| H | Isopropyl | Isobutyl |
| H | 3-p-tolylsulfonamidopropyl | H |
| H | 2-p-tolylsulfonamidoethyl | n-Butyl |
| H | H | 3-indolylmethyl |
| H | H | 3-ureidopropyl |
| H | H | Methoxymethyl |
| H | Ethyl | Benzylmercaptomethyl |
| H | n-Butyl | 2-benzylmercaptoethyl |
| H | 3-indolylmethyl | 2-methylmercaptoethyl |
| H | 5-imidazolylmethyl | p-Ethoxybenzyl |
| H | Carbamylmethyl | p-Benzyloxybenzyl |
| H | 2-carbamylethyl | p-Hydroxybenzyl |
| H | 2-carbamylethyl | 2-carbamylethyl |
| H | 3-carbamylpropyl | Carbamylmethyl |
| H | 3-guanidylpropyl | s-Butyl |
| H | H | Benzyl |
| H | p-Hydroxybenzyl | Benzyl |
| H | p-Hydroxybenzyl | Isopropyl |
| H | H | Methyl |
| H | H | Ethyl |
| H | s-Butyl | 2-hydroxyethyl |
| H | p-Hydroxybenzyl | 2-carbamylethyl |
| H | p-Hydroxybenzyl | 4-p-tolylsulfonamidobutyl |
| Acetyl | Methyl | 2-aminoethyl |
| H | H | p-Hydroxybenzyl |
| Tosyl | 3-guanidylpropyl | 5-imidazolylmethyl |
| t-Butyloxycarbonyl | 4-p-tolylsulfonamidobutyl | 3-guanidylpropyl |
| H | 4-p-tolylsulfonamidobutyl | 3-guanidylpropyl |
| t-Butyloxycarbonyl | p-Hydroxybenzyl | 3-guanidylpropyl |
| H | p-Hydroxybenzyl | 3-guanidylpropyl |
| H | 4-aminobutyl | Benzyl |
| H | 2-aminoethyl | s-Butyl |

cedure simultaneously cleaves any lower alkanoyloxy and benzoyloxy groups present elsewhere in the molecule. It does not cleave t-butyl esters.

EXAMPLE 33

*N-[2-isopropyl-3-(cyclohexyloxycarbonyl)carbazoyl] O-benzoyl-L-serine t-butyl ester*

N-[2-isopropyl - 3 - (cyclohexyloxycarbonyl) - carbazoyl]-O-benzoyl-L-serine as the free carboxylic acid is dispersed in methylene chloride and a ten-fold excess of liquid isobutylene is introduced to the chilled mixture, followed by 0.5% concentrated sulfuric acid. The reaction mixture is agitated at room temperature until a clear solution forms, then cooled and neutralized with cold aqueous sodium bicarbonate. The solvent and excess isobutylene are then evaporated at reduced pressure to obtain the desired ester. The benzoyloxy group may be cleaved with aqueous base as in Example 32 without hydrolyzing the t-butyl ester.

The other carboxylic acids prepared as in Example 32 and having free amino substituents masked by acid-stable protecting groups are converted to their t-butyl esters by the described procedure, with simultaneous etherification of any hydroxybenzyl or hydroxyalkyl groups present elsewhere in the molecule.

The t-butyl esters are cleaved by the acid hydrolysis procedures of Example 32, or by treatment with trifluoracetic acid at room temperature in anhydrous ether.

EXAMPLE 34

*N-[2-benzyl-3-(formyl)-carbazoyl]isoleucine p-nitrophenoxy ester*

To a 0.5 molar solution of N-[2-benzyl-3-(formyl)-carbazoyl]-isoleucine in ethyl acetate is added a 1.2 molar proportion of p-nitrophenol. The mixture is cooled to 0° C. and a molar proportion of dicyclohexylcarbodiimide is added. The reaction mixture is stirred 30 minutes at 0° and 1.5 hours at room temperature, then filtered and the filtrate evaporated. The resulting residue is purified by trituration with ethanol. The other carboxylic acids of Example 32 having masked amino groups are converted to phenoxy and nitrophenyl esters in the same way.

The nitrophenoxy esters are employed directly for acylation of amino groups in the following manner: to a solution of equimolar proportions of ethyl glycinate hydrochloride and triethylamine in chloroform (about 6–10 ml. per gram of glycinate) is added an equimolar proportion of the title nitrophenyl ester, and the reaction mixture is kept at room temperature for 24 hours. It is then evaporated at reduced pressure and the residue is treated with ethyl acetate and water. The organic layer is washed with aqueous ammonia, dilute hydrochloric acid and water. Evaporation of the ethyl acetate yields N-[2-benzyl - 3 - (formyl) - carbazoyl]isoleucyl glycinate ethyl ester.

EXAMPLE 35

*N-(2-p-hydroxybenzylcarbazoyl)-isoleucyl-histidyl-prolyl-phenylalanine methyl ester*

N-[2-p-hydroxybenzyl-3 - (t - butyloxycarbonyl)carbazoyl]isoleucine methyl ester, prepared in Example 26, is converted to the free acid by the basic hydrolysis of Example 9 and this product is coupled with L-histidyl-L-prolyl-L-phenylalanine methyl ester, employing the dicyclohexylcarbodiimide procedure of Example 10. The t-butyloxycarbonyl masking group is then cleaved with acid by the procedure of Examples 6–7 to obtain the desired pentapeptide.

EXAMPLE 36

*N-[2-p-hydroxybenzyl-3-(valyl) - carbazoyl] - isoleucyl-histidyl-prolyl-phenylalanine methyl ester*

This hexapeptide is prepared from the product of Example 35 by coupling with carbobenzoxy-L-valine following the procedure of Example 8, and then cleaving the carbobenzoxy group with hydrogen bromide as in Example 11.

EXAMPLE 37

*N-[22-p-hydroxybenzyl-3 - (nitroarginyl - valyl) - carbazoyl]-isoleucyl-histidyl-prolyl-phenylalanine methyl ester*

This heptapeptide is prepared by coupling the product of Example 36 with carbobenzoxy-nitro-L-arginine as described in Example 8, followed by cleavage of the carbobenzoxy group as described in Example 11.

EXAMPLE 38

*N-[2-p-hydroxybenzyl-3-(aspartyl - arginyl - valyl) - carbazoyl]-isoleucyl-histidyl-prolyl-phenylalanine*

The heptapeptide methyl ester of Example 37 is coupled with carbobenzoxy-L-aspartic acid β-benzyl ester as described in Example 12, and all protecting groups are removed by the sequence of Example 13 to obtain this product.

EXAMPLE 39

*N-[2-p-hydroxybenzyl-3-(carbobenzoxy-[[S-benzyl]] cysteinyl)carbazoyl]-isoleucine*

N - (2 - p - hydroxybenzylcarbazoyl)isoleucine methyl ester, prepared in Example 27, is condensed with carbobenzoxy-S-benzyl cysteine, employing dicyclohexylcarbodiimide and the procedure of Example 8. The tripeptide methyl ester is then subjected to basic hydrolysis as described in Examples 9 and 15 to obtain the product.

EXAMPLE 40

*Disulfide of N-[2-p-hydroxybenzyl - 3 - (cysteinyl)-carbazoyl]isoleucyl-glutaminyl-aspariginyl-cysteinyl - propylleucyl-glycine amide*

The product of Example 39 is condensed with glutaminyl-aspariginyl-S-benzyl cysteinyl-prolyl-leucyl-glycine amide (J. Am. Chem. Soc., 81, 2504, 1959) as described in Example 10, and the carbobenzoxy and benzyl thioether groups are cleaved by treatment with sodium in liquid ammonia as described in Example 29. After the ammonia has been removed by evaporation, the dimercapto compound is oxidized to the desired disulfide product by solution in $CO_2$-free water at pH 6.5 and aeration with $CO_2$-free air for 2 hours. Evaporation at reduced pressure and freeze-drying yields the product.

EXAMPLE 41

*N-[3-(carbobenzoxy prolyl-prolyl)-carbazoxyl] phenylalanine*

N-carbazoyl phenylalanine methyl ester, prepared in Example 28, is condensed with carbobenzoxy prolyl proline by the procedure of Example 8 and the product is subjected to basic hydrolysis by the procedure of Example 9 to obtain this tetrapeptide.

EXAMPLE 42

*N-[3-(prolyl-prolyl)carbazoyl]phenylalanyl-seryl - prolyl-phenylalanyl-nitro arginine methyl ester*

The product of Example 41 is condensed with seryl-prolyl-phenylalanyl-nitro arginine methyl ester (J. Org. Chem. 26, 3872, 1961) by the procedure of Example 10 and the carbobenzoxy group is removed with hydrogen bromide as described in Example 11 to obtain this octapeptide.

EXAMPLE 43

*N-[3-(arginyl-prolyl-prolyl)-carbazoyl]-phenylalanyl-seryl-prolyl-phenylalanyl-arginine*

The product of Example 42 is condensed with carbobenzoxy-nitro arginine as described in Example 8 and the resulting nonapeptide is stripped of protecting groups by the sequence of Example 13 to obtain this product.

EXAMPLE 44

*N-[2-p-hydroxybenzyl-3-(carbobenzoxy-[[S-benzyl]]-cysteinyl)-carbazoyl]-phenylalanine*

N-(2-p-hydroxybenzylcarbazoyl) phenylalanine ethyl ester, prepared in Example 28, is condensed with carbobenzoxy-S-benzyl cysteine, employing dicyclohexylcarbodiimide in the procedure of Example 8, and the resulting tripeptide compound is subjected to basic hydrolysis as described in Examples 9 and 15 to prepare this product.

EXAMPLE 45

*Disulfide of N-[2-p-hydroxybenzyl-3-(cysteinyl)-carbazoyl]-phenylalanyl-glutaminyl-asparaginyl-cysteinyl-propyl-lysyl-glycine amide*

Carbobenzoxy-glutaminyl-asparaginyl - S - benzyl - cysteinyl-prolyl-Nε-tosyl-lysylglycinamide (J. Am. Chem. Soc., 82, 3195, 1960) is treated with hydrogen bromide in acetic acid as in Example 11 to cleave the carbobenzoxy group. The resulting hexapeptide is condensed with the product of Example 44 by the procedure of Example 10. The tosyl, benzyl thioether and carbobenzoxy protecting groups are then cleaved by treatment with sodium in liquid ammonia, and the resulting di-mercapto compound is oxidized with air to the desired disulfide, as in the last two steps of Example 40.

EXAMPLE 46

Utilizing the procedures and intermediates of the foregoing examples the following polypeptides are prepared wherein the α-methylidyne group of each amino acid moiety indicated by an asetrisk is replaced by a nitrogen:

HCyS-Tyr-Phe-GLu($NH_2$)-Asp($NH_2$)-CyS-Pro-Arg-Gly($NH_2$)

HArg-Pro-Pro-Gly-Phe-Ser-Pro-Phe-ArgOH

HAsp-Arg-Val-Tyr-Ilue-His-Pro-PheOH

HAsp-Arg-Val-Tyr-Val-His-Pro-PheOH

HCyS-Tyr-Ileu-Glu-($NH_2$)-Asp($NH_2$)-CyS-Pro-Leu-Gly($NH_2$)

HArg-Pro-Pro-Gly-Phe-Ser-Pro-Phe-ArgOH

HCyS-Tyr-Phe-Glu($NH_2$)-Asp($NH_2$)-CyS-Pro-Lys-Gly($NH_2$)

HCyS-Tyr-Phe-Glu($NH_2$)-Asp($NH_2$)-CyS-Pro-Arg-Gly($NH_2$)

These polypeptides are obtained in the form of their acid-addition salts by treatment of the base in solution with an equivalent proportion of a listed acid, followed by evaporation of the solvent:

| | |
|---|---|
| hydrochloric acid | succinic acid |
| phosphoric acid | fumaric acid |
| sulfuric acid | p-toluenesulfonic acid |
| acetic acid | citric acid |

EXAMPLE 47

*Evaluation of enzymatic stability*

A. *Chymotrypsin.*—The peptide (1 mg.) is dissolved in 0.20 cc. pH 8.6 aqueous buffer and 0.020 cc. of a solution of 0.25% w./v. crystalline chymotrypsin (Worthington) is added (enzyme:substrate=1:20). After incubation for 24 hours at 38° the reaction mixture is heated to 100° for 5 minutes and subsequently assayed by paper chromatography on system (9).

The hexapeptide L-Val-L-Tyr-L-Val-L-His-L-Pro-L-PheOH is hydrolyzed quautitatively to the dipeptide L-valyl-L-tyrosine ($R_f$=0.65; positive reactions with $FeCl_3$-$K_3Fe(CN)_6$, p-nitro benzenediazonium fluoroborate spray and ninhydrin) and the tetrapeptide L-valyl-L-histidyl-L-prolyl-L-phenylalanine ($R_f$=0.4; positive reactions with ninhydrin and p-nitrobenzenediazonium fluoroborate spray). In a similar manner the corresponding hexapeptide wherein the N-terminal valyl unit is replaced by an N-isopropyl glycyl unit ($R_f$=0.48) is cleaved to the same tetrapeptide L-valyl-L-histidyl-L-prolyl-L-phenylalanine and the dipeptide N-isopropylglycyl-L-tyrosine of $R_f$=0.55 (positive to $$FeCl_3\text{-}K_3Fe(CN)_6$$

and p-nitrobenzenediazonium fluoroborate).

Under identical reaction conditions the products of Examples 13, 14 and 19 are found to be completely stable toward enzymatic digestion by chymotrypsin.

B. *Pepsin.*—The peptide (1 mg.) is dissolved in 0.18 cc. of 0.02 N hydrochloric acid, 0.16 cc. of 0.25% crystalline pepsin (Worthington) in 0.02 N hydrochloric acid is added (enzyme:substrate ratio 1:2.5) and the solution incubated at 38° for 24 hours. At that time pH 8 aqueous buffer is added and the reaction mixture then evaluated by paper chromatography on system (17).

Valine is released from the hexapeptide L-Val-L-Tyr-L-Val-L-His-L-Pro-L-PheOH under these conditions, and a new spot, apparently the pentapeptide, is formed with a slightly lower $R_f$ (0.5) than the starting material ($R_f$=0.56).

The heptapeptide product of Example 14 is completely stable under the same reaction conditions, and the product of Example 19 ($R_f$=0.55) is digested partially (10–20%) to give two new spots of $R_f(17)$=0.4

$$(FeCl_3\text{-}K_3FeCN_6 \text{ positive})$$

and $R_f(17)$=0.33 (p-nitrobenzenediazonium fluoroborate positive). Likewise, the octapeptide product of Example 13 is degraded to a small extent (10–20%).

C. *Leucine aminopeptidase.*—The enzyme (Worthington) is activated before use for 3 hours at 40°. The activation mixture consists of 0.20 cc. of 0.025 molar $MnCl_2$ solution, 0.50 cc. of buffer (pH 8), 0.50 cc. of water and 0.20 cc. of 0.5% leucine aminopeptidase solution.

The peptide (2 mg.) is added to 0.2 cc. of the above activated leucine aminopeptidase and the resulting solution incubated at 38° for 24 hours. The mixture is then chromatographed on paper in systems (11) and (17) and the spots identified with the indicators ninhydrin, $FeCl_3$-$K_3Fe(CN)_6$ and p-nitrobenzenediazonium fluoroborate spray.

The hexapeptide L-Val-L-Tyr-L-Val-L-His-L-Pro-L-PheOH is cleaved to valine, tyrosine and the tripeptide L-histidyl-L-prolyl-L-phenylalanine under these conditions. No cleavage is observed with the products of Examples 13, 14 or 19.

What is claimed is:

1. A compound of the formula

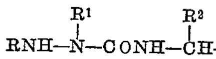

wherein

R is selected from the group consisting of formyl, acetyl, t-butyloxycarbonyl, cyclopentyloxycarbonyl and cyclohexyloxycarbonyl;

$R^1$ is selected from the group consisting of hydrogen, primary and secondary lower alkyl, 3-indolylmethyl, 5-imidazolylmethyl, $—ZCOR^4$, $—ZCH_2NHR^5$, $—(CH_2)_3NHC(:NH)NHR^6$, benzyl, and

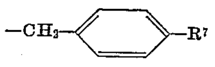

$R^2$ is selected from the group consisting of hydrogen, primary and secondary lower alkyl, 3-indolylmethyl, 5-imidazolylmethyl, 3-ureidopropyl, $—Z^1R^8$, mercaptomethyl, benzylmercaptomethyl, 2-mercaptoethyl, 2-methylmercaptoethyl, 2-benzylmercaptoethyl, $—ZCOR^4$, $—ZCH_2NHR^5$, $$—(CH_2)_3NHC(:NH)NHR^6,$$

benzyl and

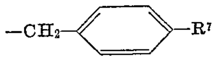

$R^3$ is selected from the group consisting of hydroxy, lower alkoxy, phenoxy, para-nitrophenoxy and amino;

$R^4$ is selected from the group consisting of hydroxy, lower alkoxy, and amino;

$R^5$ is selected from the group consisting of hydrogen, tosyl, cyclopentyloxycarbonyl, cyclohexyloxycarbonyl, and benzyloxycarbonyl;

$R^6$ is selected from the group consisting of hydrogen, nitro, benzyloxycarbonyl and tosyl;

$R^7$ and $R^8$ are selected from the group consisting of hydroxy, lower alkoxy, benzyloxy, lower alkanoyloxy and benzoyloxy;

Z is straight-chain alkylene of from one to three carbon atoms; and $Z^1$ is straight-chain alkylene of from one to two carbon atoms.

2. N-[2-isopropyl - 3 - (t-butyloxycarbonyl)carbazoyl] O-benzoyltyrosine ethyl ester.

3. N-[2-p-hydroxybenzyl-3 - (t-butyloxycarbonyl)carbazoyl]isoleucine methyl ester.

4. N-(3 - cyclohexyloxycarbonyl - carbazoyl)phenylalanine amide.

5. N-[2-benzyl - 3 - (formyl)-carbazoyl]isoleucine p-nitrophenoxy ester.

6. N-[2-p-hydroxybenzyl - 3 - (cyclopentyloxycarbonyl)carbazoyl]-phenylalanine ethyl ester.

7. A compound selected from the group consisting of those of the formula $$H_2N-\overset{\overset{R^1}{|}}{N}-CONH-\overset{\overset{R^2}{|}}{C}H-COR^3$$

and the mineral acid addition salts thereof, wherein $R^1$ is selected from the group consisting of hydrogen, primary and secondary lower alkyl, 3-indolylmethyl, 5-imidazolylmethyl, $-ZCOR^4$, $-ZCH_2NHR^5$, $$-(CH_2)_3NHC(:NH)NHR^6,$$

benzyl, and

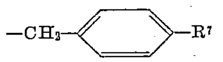

$R^2$ is selected from the group consisting of hydrogen, primary and secondary lower alkyl, 3-indolylmethyl, 5-imidazolylmethyl, 3-ureidopropyl, $-Z^1R^8$, mercaptomethyl, benzylmercaptomethyl, 2-mercaptoethyl, 2-methylmercaptoethyl, 2-benzylmercaptoethyl, $-ZCOR^4$, $-ZCH_2NHR^5$, $$-(CH_2)_3NHC(:NH)NHR^6,$$

benzyl, and

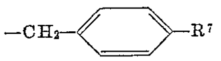

$R^3$ is selected from the group consisting of hydroxy, lower alkoxy, phenoxy, para-nitrophenoxy and amino;

$R^4$ is selected from the group consisting of hydroxy, lower alkoxy, and amino;

$R^5$ is selected from the group consisting of hydrogen, tosyl, cyclopentyloxycarbonyl, cyclohexyloxycarbonyl, and benzyloxycarbonyl;

$R^6$ is selected from the group consisting of hydrogen, nitro, benzyloxycarbonyl and tosyl;

$R^7$ and $R^8$ are selected from the group consisting of hydroxy, lower alkoxy, benzyloxy, lower alkanoyloxy and benzoyloxy;

Z is a straight-chain alkylene of from one to three carbon atoms; and $Z^1$ is straight-chain alkylene of from one to two carbon atoms.

8. N-(2-p-hydroxybenzylcarbazoyl) valine ethyl ester.

9. N-(2-sec. butylcarbazoyl) O-benzoyl-tyrosine ethyl ester.

10. N-(2-isopropylcarbazoyl) phenylalanine methyl ester.

11. N-(2-isobutylcarbazoyl) leucine ethyl ester.

12. N-(2-isopropylcarbazoyl) leucine amide.

References Cited

UNITED STATES PATENTS

| | | | |
|---|---|---|---|
| 2,498,665 | 2/1950 | Emerson | 260—112.5 |
| 2,524,422 | 10/1950 | Boothe et al. | 260—112.5 |
| 3,032,581 | 5/1962 | Leonard | 260—471 |
| 3,048,619 | 8/1962 | Pray | 260—471 |
| 3,217,029 | 11/1965 | Shavel et al. | 260—471 |

LORRAINE A. WEINBERGER, *Primary Examiner.*

PERRY A. STITH, L. A. THAXTON, *Assistant Examiners.*